United States Patent [19]

Bolen

[11] 4,405,099
[45] Sep. 20, 1983

[54] APPARATUS FOR ACTIVATING SYSTEM IN RESPONSE TO IMPACT

[75] Inventor: Ralph A. Bolen, London, Ohio

[73] Assignee: John Sawyer, Cincinnati, Ohio

[21] Appl. No.: 261,261

[22] Filed: May 6, 1981

[51] Int. Cl.³ .............................................. B64D 25/00
[52] U.S. Cl. .................................. 244/1 R; 116/210;
244/33; 280/734; 441/30
[58] Field of Search ................. 244/1 R, 33, 119, 139,
244/140, 137 R; 116/32, 203, 210; 441/6, 7, 30;
180/282; 280/734

[56] References Cited

U.S. PATENT DOCUMENTS

| | | | |
|---|---|---|---|
| 1,836,495 | 12/1931 | Paulson | 116/210 |
| 2,649,311 | 8/1953 | Hetrick | 280/734 |
| 2,778,332 | 1/1957 | Talbot | 244/1 R |
| 3,332,390 | 7/1967 | Ashline | 116/210 |
| 3,465,987 | 9/1969 | Harmon et al. | 244/1 R |
| 3,487,810 | 1/1970 | Clement | 116/210 |
| 3,727,575 | 4/1973 | Prachar | 280/734 |
| 3,767,227 | 10/1973 | Furusho et al. | 280/734 |
| 3,929,091 | 12/1975 | Holder | 116/210 |

FOREIGN PATENT DOCUMENTS 1516595  7/1969  Fed. Rep. of Germany ........ 244/33

*Primary Examiner*—Charles E. Frankfort
*Attorney, Agent, or Firm*—King and Liles

[57] ABSTRACT

An impact apparatus responsive to a time rate of change of velocity of a housing is used to activate a system. A specific application of the invention fixes the housing to an aircraft body with an inertial member movably contained within the housing and uses the relative movement between the housing and inertial member upon impact to inflate and elevate a balloon above the aircraft.

23 Claims, 4 Drawing Figures

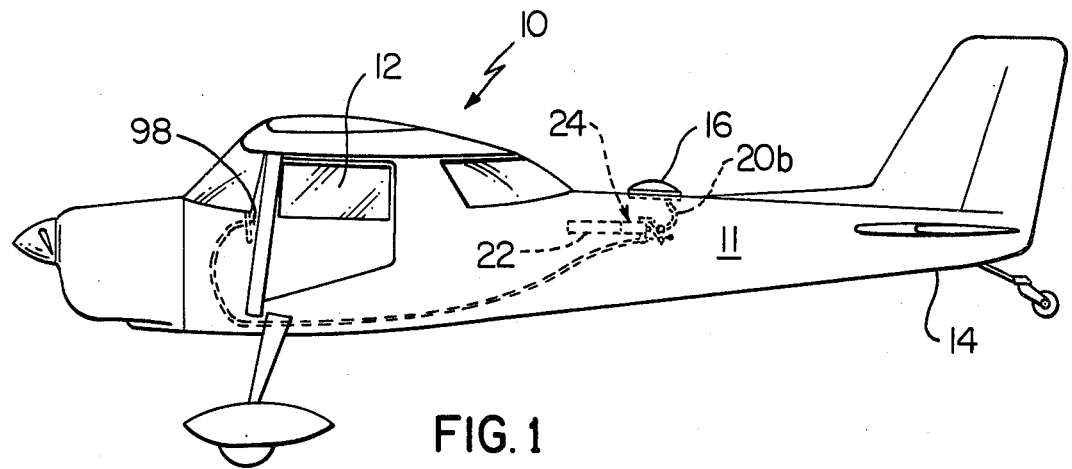
FIG. 1
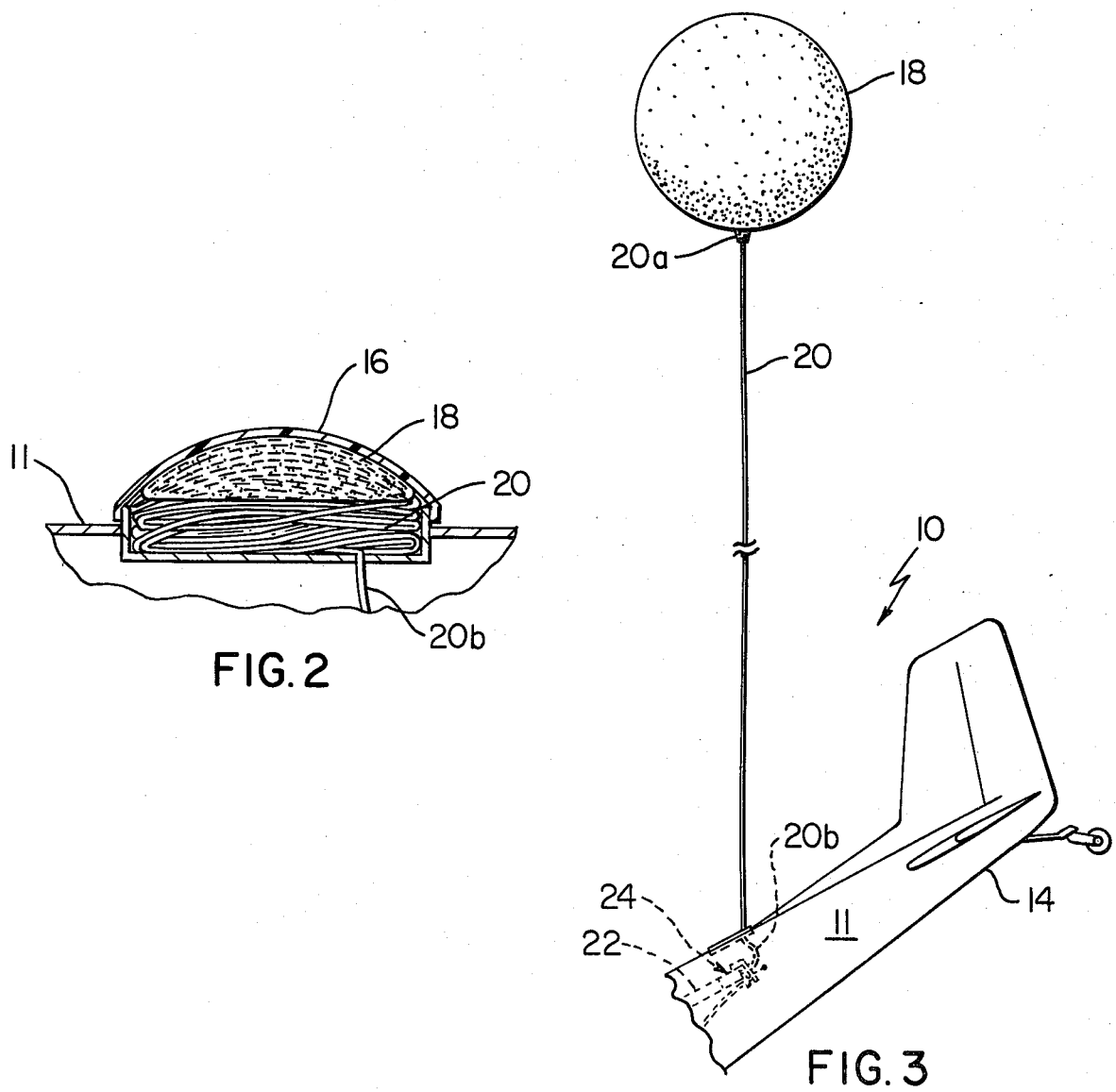
FIG. 2
FIG. 3

APPARATUS FOR ACTIVATING SYSTEM IN RESPONSE TO IMPACT

BACKGROUND

The present invention relates generally to an apparatus for activating a system in response to impact and more particularly concerns an apparatus for sensing impact of a movable mass and responding thereto. This invention will be specifically disclosed in connection with an aircraft emergency system which assists search crews locating a fallen aircraft. In the disclosed embodiment, a visual balloon is filled with a lighter than air gas and rises several hundred feet above the crash sight to visually aid in locating the crash sight in response to impact of the aircraft.

It is an unfortunate fact that many aircrafts crash into the ground or water. When such occurs, the misfortune is often compounded by the inability of a search crew to specifically locate the fallen aircraft. This is particularly true in a case of small aircraft which are relatively small physically and which have often traveled over unrecorded air routes. One instance in which search crews have difficulty locating fallen aircraft is when the aircraft crashes in a heavily wooded area. Trees surrounding the fallen aircraft obscure it from conspicuous view of a search aircraft with the result that observers in the search aircraft are unable to locate the fallen aircraft. This is frequently true even when the fallen aircraft has been directly beneath the search aircraft. When occupants of a fallen aircraft are in need of emergency medical care, time is commonly of the essence. In such circumstances, time delays in locating a fallen aircraft may involve life or death situations, and needless time delays may result in needless deaths.

Another instance in which a fallen aircraft or the occupants thereof are difficult to locate is when the aircraft crashes into a large body of water such as a lake or ocean. Many times the aircraft will sink into the water before a search aircraft locates the crash sight. Many times these aircraft are permanently lost. Even when the surviving occupants of an aircraft which has fallen into a large body of water use life rafts and remain atop the water, the close physical proximity of the life raft to the water surface often results in the inability of the search crew to visually distinguish survivors or their life rafts from the water surface. Similar to the instance in which the fallen aircraft is within a heavily wooded area, it is not uncommon for observers in a search aircraft to fail to visually detect survivors or their lift rafts on the surface of a body of water, even when the search aircraft is in close proximity to the survivors.

The present invention greatly assists observers of a search aircraft in overcoming their visual shortcomings and in locating fallen aircraft by supplying an expanded balloon above the crash sight. The expanded balloon is preferably elevated to a heighth which is sufficient to clear the tree lines in wooded areas and which is clearly and visually distinguishable by an observer in a search aircraft. The use of an elevated balloon permits observers in a search aircraft to readiy spot the craft's crash location over the horizon and to expedite rescue operations. In the case of an aircraft that has crashed into a large body of water, the pressurized balloon of the embodiment specifically illustrated herein would enable location and possible retrieval of otherwise lost aircraft.

It is an object of the present invention to provide an apparatus which activates a system in response to impact.

It is a further object of the present invention to provide an apparatus to release pressurized contents of a source of compressed fluid in response to impact.

It is a further object of the present invention to provide an apparatus which is responsive to a crash of a moving vehicle.

It is yet another object of the present invention to provide an emergency crash system for an aircraft to assist in locating that aircraft in a crash situation.

It is a further object of the present invention to provide an inflatable balloon which inflates and rises above an aircraft to indicate location in response to impact of the aircraft.

SUMMARY OF THE INVENTION

In accordance to the invention, an impact apparatus is provided which includes a housing with an inertial member disposed within the housing and movable therein within a predetermined range in response to a time rate of change of velocity of the housing. The apparatus also includes an actuator operatively movable in response to the movement of the inertial member which is, in turn, operable to activate a closure member of a valve.

The impact apparatus preferably has a housing with first and second end components. The first end component has a first fluid passage which is adapted to selectively communicate with a source of pressurized fluid through the valve.

In accordance with a further aspect of the present invention, a second fluid passage is contained within the inertial member and this second fluid passage is in selective fluid communication with the first fluid passage. In a specific embodiment of the invention, the actuator is in the form of a firing pin which extends into the first fluid passage during at least a portion of the inertial member's range of movement within the housing to selectively engage and unseat the valve and discharge the contents of a pressurized fluid source.

In accordance to a further and specific aspect of the invention, a rigid fluid conduit is in fluid communication with a second fluid passage in the moving inertial member and the rigid fluid conduit and is reciprocally movable through the second end component in sealed relationship thereto. Preferably, the impact apparatus has a manual control arm which is secured relative to the housing and is operative to control movement of the inertial member.

In accordance with yet another aspect of the invention, an aircraft is provided with an apparatus for visually indicating a specific location of the aircraft in response to impact. The aircraft includes a body and a container for lighter than air fluid. A normally closed valve in the container controls discharge of the lighter than air fluid therefrom. An inertial member is movable relative to the aircraft body in response to a time rate of change of velocity of the body and is operative to open the valve. Flexible tubing is provided which is in selective fluid communication with the lighter than air fluid through the valve. An inflatable balloon is releasably secured to the aircraft and in selective fluid communication with the lighter than air fluid through the valve and the flexible tubing.

In accordance with a further and more specific form of the invention, the balloon is releasable from the aircraft body in response to inflation of the balloon with lighter than air fluid from a container on the aircraft. Most preferably the balloon is secured to the aircraft body by a cover on the exterior of the body with the cover being separable under the influence of fluid pressure within the balloon when the balloon is being inflated. The cover is most preferably disposed in the rear and on the top side of the aircraft.

BRIEF DESCRIPTION OF THE DRAWINGS

Other objects and advantages of this invention will become apparent upon reading the following detailed description and upon reference to the drawings, in which:

FIG. 1 is a side elevational view of an aircraft utilizing one form of the present invention.

FIG. 2 is a somewhat enlarged fragmentary view of a detachable cover on the tail section of the aircraft of FIG. 1 which houses an inflatable balloon used in the preferred embodiment.

FIG. 3 is a fragmentary view of the tail section of the aircraft of FIG. 1 after the aircraft has crashed, depicting the visual balloon in an inflated state elevated above a crash site.

Figure 4:
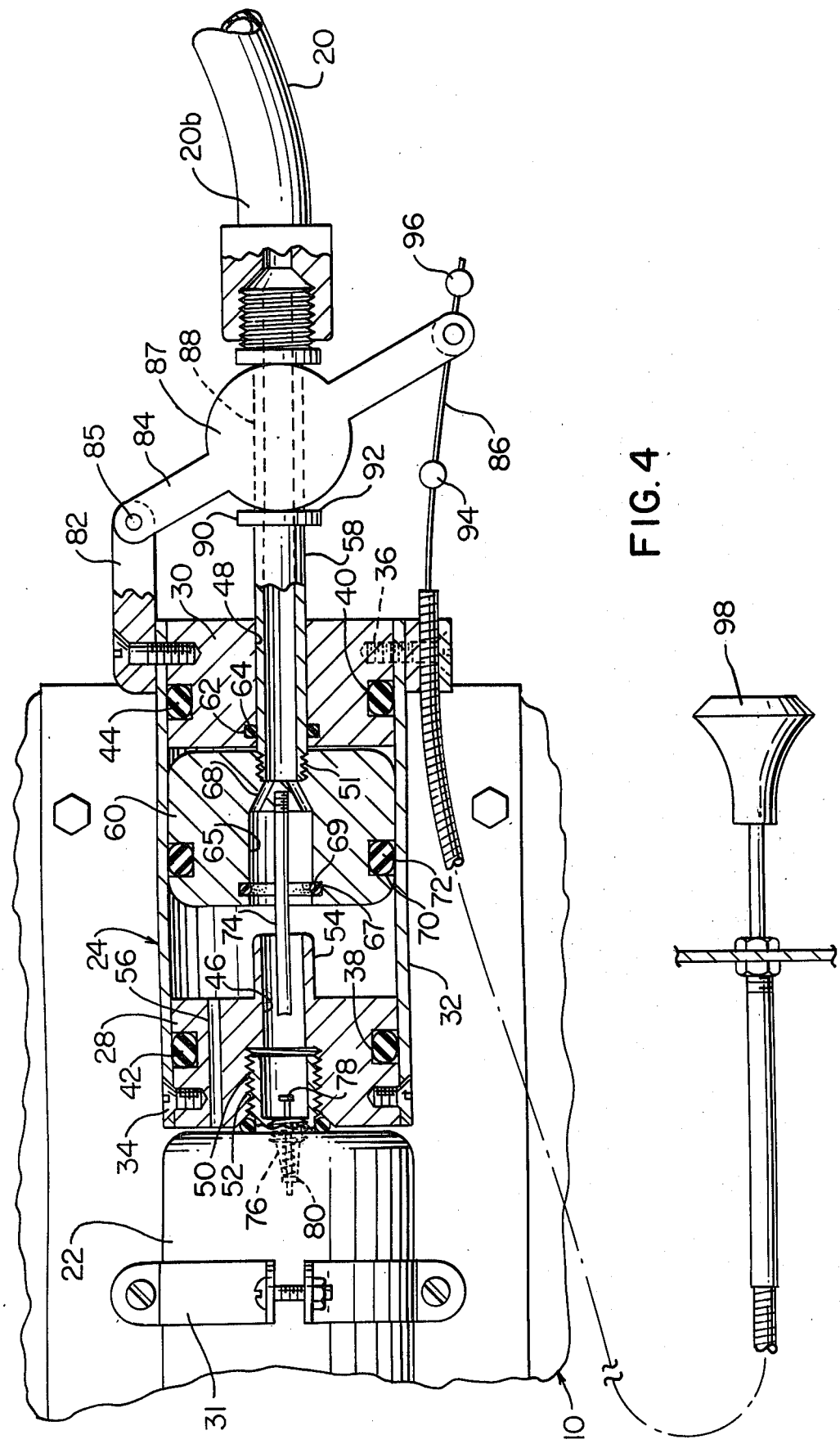
FIG. 4 is a fragmentary elevational view, partially in cross section, of an impact apparatus and compressed gas container for supplying lighter than air gas to inflate the balloon of FIG. 3 after the aircraft of FIGS. 1–3 has experienced impact.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE PREFERRED EMBODIMENT

Referring now to the drawings and to FIG. 1 in particular, an aircraft generally designated by the numeral 10 is shown which uses one form of the present invention. The aircraft 10 is illustrated as having a main body 11 into which a passenger compartment 12, adapted to carry a pilot and several passengers is provided. On the exterior of the aircraft 10, proximal to a tail section 14 and on the top side of the body 11, is a dome cover 16 which houses a deflated balloon 18 (see FIG. 2 for details). The dome housing 16 is releasably secured to the body 11 of the aircraft 10.

Also housed under the dome cover 16 and beneath the deflated balloon 18 is a length of a lightweight flexible tubing 20, which tubing 20 is connected on one end 20a to the balloon 18 (see FIG. 3) and is in fluid communication withe the balloon's (18) interior. As shown in FIG. 2, the flexible tubing 20 is sinuously stored beneath the deflated balloon 18 in a manner in which the tubing 20 is overlayed back and forth over itself. The other end 20b of the flexible tubing 20, opposite the end 20a connected to the balloon 18, is connected to a container or canister 22 (see FIGS. 2 and 4) of compressed helium or other lighter than air gas. The connection to the canister 22 is by way of an impact apparatus generally designated by the numeral 24. For reasons which will be detailed hereinafter, when the aircraft is subjected to impact, as for example during a crash, the helium or other lighter than air gas contained in the canister 22 will be discharged and supplied to the balloon 18, causing removal of the dome cover 16 and the inflation and elevation of balloon 18. A depiction of the tail section of the aircraft 10 after a crash of the aircraft 10 is depicted in FIG. 3 which shows the balloon 18 inflated and elevated above the crash sight. Elevation of the balloon 18 in this manner, as described hereinafter, provides a conspicuous visual locator which may be seen over the horizon to aid in pinpointing the crash location.

The contents of the canister 22 are supplied to the balloon after the aircraft crashes by the responsive action of the impact apparatus 24, which apparatus 24 is most clearly depicted in FIG. 4. The canister 22 is a pressurized source of lighter than air gas, preferably a non-combustible gas such as the helium which is used in the preferred and illustrated embodiment.

As seen in FIG. 4, the impact apparatus 24 includes a housing of three primary components, two end components 28 and 30 which are disposed within a cylindrically shaped intermediate portion 32, which intermediate portion 32 spans the distance between the end components 28 and 30. As illustrated, these components are separate but rigidly connected. It should be readily apparent, however, that a single piece of material could be used for all three components. For purposes of description, end component 28 will be referred to as the first end component and end component 30 as the second end component. The end components 28 and 30 of the illustrated embodiment are secured within the cylindrical intermediate portion 32 through the agency of suitable fastening elements such as illustrated screws 34 and 36. The screws 34 and 36 extend through the intermediate portion 32 and the end components 28 and 30 respectively. The end components 28 and 30 have circumferential grooves 38 and 40 which receive O-rings 42 and 44 respectively. The O-rings 42 and 44 provide seals between the end components 28 and 30 and the mating segments of the cylindrically shaped intermediate portion 32 with which they are in contact.

Each of the end illustrated components 28 and 30 is also cylindrically shaped with an axis coincident with the longitudinal axis of the intermediate portion 32. A first fluid passage 46 and an opening 48 extend through the end components 28 and 30, fluid passage 46 extending through the first end component 28 and opening 48 extending through the second end component 30. These fluid passages 46 and 48 are cocentrically disposed about the respective axes of the end segments 28 and 30. The exterior axial end of end portion 28 is internally threaded at location 50 and threadably receives an exteriorally and matingly threaded nipple 52 of the compressed helium canister 22. The opposite axial side of the fluid passage 46 terminates in a nipple 54 extending axially inward from the interior wall of end component 28. The first end component 28 also has a vent passage 56 providing constant fluid communication between the ambient air and the interior of the impact housing apparatus, adjacent and interior to the end component 28.

The second end component 30, at the opposite axial end of the impact apparatus housing, as noted above, has an opening 48 extending therethrough. This opening 48 receives a rigid reciprocally moving fluid conduit 58 which is threadably received on one end by an inertial member 60 and on the opposite end by a threadable connection to the flexible hose 20. This inertial member 60 is reciprocally axially movable with respect to the intermediate portion 32 of the impact housing between the range defined by the end components 28 and 30. A circumferential groove 62 about opening 48 permits placement of an O-ring 64 between the rigid fluid conduit 58 and the second end component 30 of the housing to provide a sealing relationship between the two relatively moving components 58 and 30.

The inertial member 60 also has a second fluid passage 65 coaxially aligned with the fluid passage 46 and opening 58 of the axial end components 28 and 30 of the impact apparatus housing. This fluid passage 65 extends completely through the inertial member 60. The left hand side (in the illustration) of the fluid passage 65 is enlarged (relative to the right hand side) and has an internal diametrical dimension slightly in excess of the external diametrical dimension of the nipple 54 extending axially inward from end component 28. Further, a cylindrical groove 67 about passage 65 accommodates an O-ring 69 to provide sealing relationship between the nipple 54 and the inertial member 60 when the former (54) is disposed within the latter (60). The fluid passage 65 diverges from the enlarged diameter (the left hand side in the depiction of FIG. 4) at an intermediate location 68 adjacent end component 30. The fluid passage 65 threadably receives the rigid conduit 50 at threaded end 51 adjacent location 50.

The exterior circumferential periphery of the inertial member 60 has an annular groove 70 into which an O-ring 72 is fitted. The O-ring 72 provides a sealing fit between the exterior circumferential periphery of the inertial member 60 and the interior circumferential surface of the impact apparatus housing, both during the period when the inertial member 60 is statically disposed with respect to the impact apparatus housing and during the period that the inertial member 60 is being slidingly advanced from the illustrated position (in FIG. 4) toward the axial end component 28.

FIG. 4 also shows an actuator in the form of a firing pin 74 centrally disposed within the fluid passage 64 and extending into nipple 54 and fluid passage 46. This firing pin 74 is securely fixed and attached to the inertial member 60 for common movement therewith. The compressed gas canister 22 has a spring biased valve 76, a stem 78 of which extends into nipple 52. When the nipple 52 is threadably advanced into and received by the fluid passage 46, the stem 76 is in alignment with the firing pin 74. If engaged and moved leftwardly (in the illustration) by the firing pin 74, the valve stem 78 is operative to unseat the closure member 80 of the valve 76, permitting pressurized gas within the canister 22 to be discharged therefrom.

Also rigidly attached to the housing is a bracket 82 which pivotally supports a manual control arm 84. The manual control arm 84 is pivotally connected at pivot point 85 to the bracket 82 on its one end and to push-pull cable 86 on the opposite end, the connection to push-pull cable 86 being shiftable. Intermediate of these two end sections, the manual control arm 84 is slidably connected to the rigid fluid conduit 58. The connection between the manual control arm 84 and the rigid fluid conduit 58 is achieved by way of a bore 88 extending through the manual control arm's intermediate portion 87. The rigid fluid conduit 58 is passed through the bore 88. End stops 90 and 92, disposed on the exterior of rigid fluid conduit 58 on opposite sides of the sliding interface with the manual control arm limit the relative sliding between the manual control arm 84 and the rigid conduit 58. The range of sliding movement between the manual control arm 84 and the push-pull cable 86 is limited by a pair of lugs 94 and 96 which are secured to push-pull cable 86 at predetermined space locations from the control arm 84. The push-pull cable 86 is movable by the aid of a push-pull grip 98 attached to the end of the push-pull cable 86 opposite the connection with manual control arm 84.

In normal operation of the aircraft 10, the balloon 18, which may be of the type commonly used as weather balloons, will be deflated and stored beneath the dome cover 16 above the sinuously overlayed and stored flexible tubing 20. This relationship is shown in the depiction of FIGS. 1 and 2. If the aircraft 10 were to crash, it would inherently be subjected to substantial impact. This impact will result in a deacceleration or time rate of change of the velocity of the aircraft.

The impact apparatus housing 24 is rigidly secured to a rigid structural component aircraft 10 (as, for example, by clamps 31 in FIG. 4) and experiences the same time rate of change of velocity as the aircraft. The inertial member 60, however, is not rigidly attached to either the aircraft or the impact apparatus housing and is slidable relative to the housing. Since the inertial member 60 is not rigidly attached to either the aircraft 10 or the housing, the deacceleration of that component is equal to that of the aircraft body 11 only if the frictional forces acting upon the inertial member 60 are sufficient to match the inertial forces produced by that time rate of change of velocity upon the inertial member's (60) mass. However, the impact apparatus is designed to be lacking in sufficiently strong frictional forces to match the inertial forces resulting from a crash situation.

The impact apparatus is oriented with the end component 28 and canister 22 toward the front of the aircraft 10 so that a crash of the aircraft 10 will advance the inertial member 60 toward the front of the aircraft 10 (leftwardly as illustrated in FIG. 4). This leftward movement (toward the compressed lighter than air canister 22) forces the firing pin 74 into engagement with the valve stem 78, overcoming the spring bias of valve 76 in compressed gas canister 22 and unseating closure member 80. Vent passage 56 permits the escape of air within the space between inertial member 60 and the end portion 28 when the inertial member is advanced toward end portion 28 to aid in achieving this result. Discharge of the pressurized gas from canister 22 through the internal flow passages of the impact apparatus and to the balloon 18 results.

The leftward movement of inertial member 60 (toward the canister 22) also results in the disposition of nipple 54 of the end component 28 within the fluid passage 65 with the O-ring 67 providing a sealing relationship between the nipple 54 and the fluid passage 64. This disposition of the nipple 64 within the fluid conduit 64 establishes a continuous internal sealed flow passage through the impact apparatus and between the canister 22 and the flexible hosing 20. Thus, whenever the inertial member 60 is moved toward the canister 22 so as to cause firing pin 74 to unseat closure member 80 in valve 76, the pressurized lighter than air contents of canister 22 are supplied via flexible hosing 20 to the balloon 18.

As noted above, balloon 18 is normally stored beneath the dome cover 16 in a deflated state. The introduction of pressurized gas from canister 22 causes inflation of the balloon 18. The space limitations under dome cover 16 are somewhat limited and, when the balloon 18 begins inflating, the pressure within the balloon forces the separation of the dome cover 16 from the aircraft body 11. The dome cover 16 is designed to separate from the aircraft body 11 in response to internal pressure generated by the inflated balloon 18. In the most preferred embodiment, the dome cover 16 is secured to the exterior aircraft body 11 by hook and loop type fastening strips attached to both the dome cover 16 and body 11. These hook and loop type fasteners, which are sold commercially under the trademark VELCRO, adhere when pressed together. Hook and loop type fasteners exhibit considerable resistance to shear forces but release much more readily in response to forces substantially perpendicular to the fastener strips. These properties make such fasteners particularly suited to the instant application, since the dome cover 16 experiences considerable shearing pressure from the wind during the flight of the aircraft 10, and such fasteners offer extremely high resistances to the resulting shear forces and prevent separation of the dome cover 16 from the aircraft body 11 under such pressure conditions. On the other hand, it is desirable to cause separation of the dome cover 16 from the aircraft body 11 in response to inflation of the balloon 18. Inflation of the balloon produces sufficient force between the fastening strips in a direction substantially perpendicular to the strips and results in the dome cover's (16) separation from the aircraft body 11.

Once the dome cover 16 is separated from the aircraft, the inflated balloon 18, filled with helium (or other lighter than air gas), is free to rise into the air. The flexible hosing 20 connecting the balloon 18 with the pressurized canister 22 is most preferably constructed of lightweight material so as to reduce the lifting load on the balloon 18 as much as possible. In the preferred embodiment, the flexible hose is approximately 200 feet in length. As the freed and inflated balloon 18 rises, the sinuously overlayed flexible tubing unwinds and permits the balloon 18 to reach an elevation limited by the flexible tubing 20's length. A length of approximately 200 feet was chosen for the preferred embodiment so as to enable the balloon 18 to rise substantially above normal tree lines, which normally do not extend beyond 100 feet. However, if higher tree lines are anticipated, a longer length of flexible tubing could be used.

The impact apparatus and balloon 18 are located at the rear of the aircraft 10 so as to avoid destruction during the resulting impact of a crash. Due to the flight characteristics of most aircraft, the front end of the aircraft is the portion that most frequently experiences the greatest impact during a crash; and is most likely to be structurally damaged and undergo structural deformation. The deformation of the front end of the aircraft partially absorbs the impact of the crash so that the rear portion of the aircraft is much more likely to maintain its structural integrity.

The illustrated impact apparatus also has a manual control arm 84 which may be used to either activate or deactivate the system herein described. It is desirable to deactivate the system in several instances, as for example, during the transport of aircraft 10 on the ground. It is not uncommon to subject aircraft to time rates of change of velocity during ground transport. Since activation of the system is, in most ground transportation situations, undesirable, the push-pull grip 98 is provided and may be pushed inwardly to advance lug 94 on push-pull cable 86 toward manual control arm 84. Lug 94 is firmly attached to push-pull cable 86 and limits the movement of both the manual control arm 84 and the inertial member 60. Thus, when the lug 94 is so advanced, activation of the disclosed apparatus will not occur even if the inertial member 60 is suddenly deaccelerated.

Situations may also occur in which it is desirable to activate the disclosed system even though substantial impact of an aircraft has not occurred. One such example might include a safe non-crash landing of an aircraft that requires emergency aid. The pulling of the same push-pull grip 98 advances the lug 94 on push-pull cable 86 toward and into engagement with the control arm 84. Continued movement of the push-pull grip 98 forces movement of the control arm 84 with the resultant movement of the inertial member 60 and its firing pin 74. Once the firing pin 74 is moved to unseat the valve 86, manual activation of the system results with inflation of balloon 18 with the contents of canister 22. The pressure of inflating balloon 18 separates dome cover 16 and the balloon 18 is elevated to a position limited by the length of flexible tubing 20 in a manner identical to that described above as a result of a crash situation.

Thus it is apparent that there has been provided, in accordance with the invention, an apparatus that satisfies the objects, aims and advantages set forth below. While the invention has been described in conjunction with a specific embodiment thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. An impact apparatus, comprising:
(a) a longitudinal housing having first and second end components, said first end component having a first fluid passage extending therethrough and being adapted to selectively communicate with a source of pressurized fluid;
(b) an inertial member disposed within said housing, said inertial member being reciprocally movable within a predetermined range from one of said first and second end components to the other in response to a time rate of change of velocity of the housing, said inertial member having a second fluid passage extending therethrough in selective fluid communication with said first fluid passage;
(c) an actuator secured to the inertial member, said actuator being extendable into said first fluid passage as the inertial member is moved toward the first end component;
(d) a valve disposed in the first fluid passage for controlling fluid flow from said source of pressurized fluid, said valve being movable to an open position by the actuator as the inertial member is moved toward the first end component;
(e) a vent passage extending through said housing for exhausting fluid from space between the inertial member and the first end component as the inertial member is moved toward the first end component;
(f) a nipple extending from one of the inertial member and the first end component, said nipple partially defining one of the first and second fluid passages and being sealingly received by the other of the first and second fluid passages; and
(g) a rigid conduit secured to the inertial member in fluid communication with the second passage, said rigid conduit being reciprocally movable through the second end component as the inertial member moves through the predetermined range.

2. An apparatus as recited as claim 1 further including means for sealingly interfacing said rigid fluid conduit and said second end component.

3. An apparatus as recited in claim 1 further including a manual control arm secured relative to said housing, said manual control arm being operative to control movement to said inertial member.

4. An apparatus as recited in claim 3 further including a canister, said canister being threadably received by said first fluid passage and providing said source of pressurized fluid.

5. An apparatus as recited in claim 4 wherein said valve is spring biased to a closed position and said actuator is reciprocally movable with said inertial member to engage said valve and overcome said spring bias to open said valve.

6. An apparatus as recited in claim 4 wherein said canister contains a pressurized lighter than air fluid.

7. An apparatus as recited in claim 6 wherein said pressurized lighter than air fluid in said canister is helium.

8. An apparatus as recited in claim 3 further including a push-pull cable secured to said manual control arm, said push-pull cable being operative to control movement of said inertial movement through said manual control arm.

9. An apparatus as recited in claim 8 wherein said push-pull cable is slidingly secured to said manual control arm and further including lugs disposed upon said push-pull cable operative to limit sliding of said push-pull cable with respect to said manual control arm.

10. In combination with an aircraft, an apparatus for visually indicating a specific location of the aircraft in response to impact, comprising:
(a) an aircraft body;
(b) a container for lighter than air fluid, said container having a normally closed valve controlling discharge of fluid from the container;
(c) a sensor housing including first and second end components secured to said aircraft body, said first end component having a first fluid passage extending therethrough and being adapted to receive the container valve;
(d) an inertial member disposed within said housing, said inertial member being reciprocally movable within a predetermined range from one of said first and second end components to the other in response to a time rate of change of velocity of said aircraft body, said inertial member having a second fluid passage extending therethrough and in fluid communication with said first fluid passage;
(e) an actuator secured to said inertial member, said actuator being extendable into the first passage as the inertial member is moved toward the first end component to move the container valve to an open position;
(f) a vent passage extending through said housing for exhausting fluid from space between the inertial member and the first end component as the inertial member is moved toward the first end component;
(g) a nipple extending from one of the inertial member and the first end component, said nipple partially defining one of the first and second fluid passages and being sealingly received by the other of the first and second fluid passages;
(h) a rigid conduit secured to the inertial member in fluid communication with the second passage, said rigid conduit being reciprocally movable through the second end component as the inertial member moves through the predetermined range;
(i) a flexible tubing connected to said rigid conduit outside the housing in selective communication with said lighter than air fluid through said valve and said first and second fluid passages; and
(j) an inflatable balloon releasably secured to said aircraft body, the interior of said balloon being in selective fluid communication with said container through said flexible tubing.

11. An apparatus as recited in claim 10 wherein said balloon is releasable from said aircraft body in response to inflation of the balloon with lighter than air fluid from said container.

12. An apparatus as recited in claim 11 wherein said flexible tubing is sinuously stored on said aircraft body adjacent said balloon and movable therewith to permit elevation of said balloon from said aircraft body when the balloon is inflated.

13. An apparatus as recited in claim 12 wherein said balloon is secured to aircraft body by a cover on the exterior of said body, said cover being separable from said aircraft body under the fluid pressure within said balloon when said balloon is inflated.

14. An apparatus as recited in claim 13 wherein said cover is disposed in the rear of said aircraft.

15. An apparatus as recited in claim 14 wherein said cover is disposed on the topside of said aircraft.

16. An apparatus as recited in claim 12 further including a housing, said housing being rigidly secured to said aircraft body and having first and second end components, said inertial member being movably disposed within said housing.

17. An apparatus as recited in claim 10 wherein said container is threadably received by said first fluid passage.

18. An apparatus as recited in claim 17 wherein said valve is spring biased to a closed position and said actuator is reciprocally movable with said inertial member to engage said valve and overcome said spring bias to open said valve.

19. An apparatus as recited in claim 17 wherein said container contains pressurized helium.

20. An apparatus as recited in claim 17 further including a manual control arm secured relative to said housing, said manual control arm being operative to control movement of said inertial member.

21. An apparatus as recited in claim 20 further including a push-pull cable secured to said manual control arm, said push-pull cable being operative to control movement of said inertial movement through said manual control arm.

22. An apparatus as recited in claim 21 wherein said push-pull cable is slidingly secured to said manual control arm and further including lugs disposed upon said push-pull cable with respect to said manual control arm.

23. An apparatus as recited in claim 10 further including means for sealingly interfacing said rigid fluid conduit and said second end component.

* * * * *